March 30, 1965  J. V. BORDEN  3,175,293
DENTAL HANDPIECE
Filed Oct. 10, 1958  3 Sheets-Sheet 1

INVENTOR
JOHN V. BORDEN,
BY *Fisher, Christen & Goodson*
ATTORNEYS

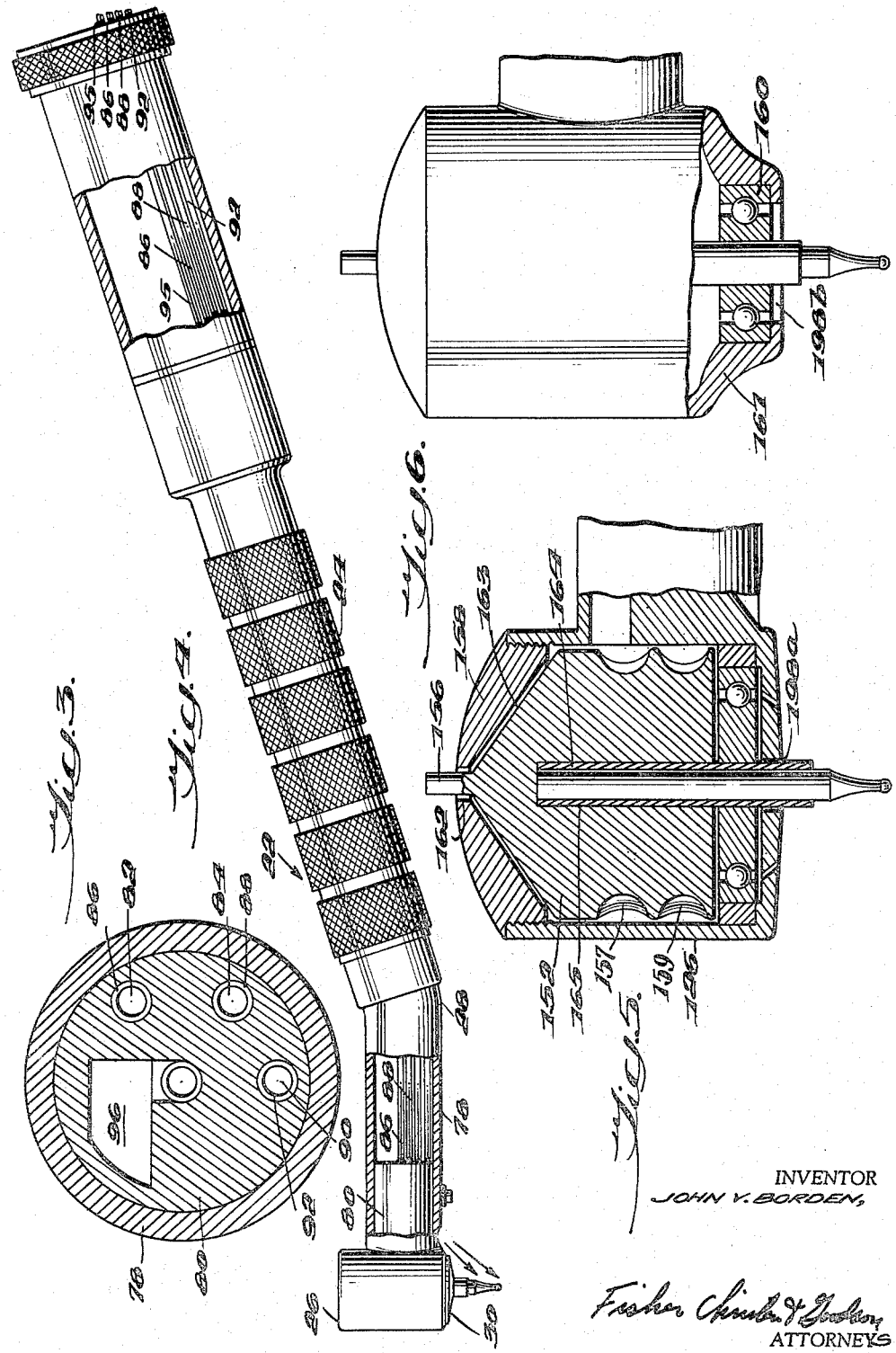

March 30, 1965  J. V. BORDEN  3,175,293
DENTAL HANDPIECE
Filed Oct. 10, 1958  3 Sheets-Sheet 3

INVENTOR
JOHN V. BORDEN

BY Fisher, Christen & Goodson
ATTORNEYS

United States Patent Office 3,175,293
Patented Mar. 30, 1965

3,175,293
DENTAL HANDPIECE
John V. Borden, Ranson, W. Va.
Filed Oct. 10, 1958, Ser. No. 766,584
13 Claims. (Cl. 32—27)

This invention relates generally to dental handpieces and more particularly to dental handpieces in which the dental bur is driven through the action of a high speed fluid driven rotor.

One object of this invention is to lessen the undesirable noise and vibrations in such a handpiece by separating the rotating unit from the motor housing by an absorbing medium such as air, fluid, a resilient material such as rubber, or a combination of these mediums.

In handpieces of this type, considerable play must be present between the rotor bearings in order to avoid high friction. In this invention air is forced between the space between the bearings which results in a cushion of air at high speeds. This sometimes permits an undesirable degree of whipping of the air rotor. It is a further object of this invention to give greater stability to the air rotor by providing it with a plurality of rows of vanes designed to receive air from a plurality of air jets.

A further problem in handpieces of this type is coasting of the rotor after the air power has been stopped. An object of the invention is to reduce this problem through the use of a novel magnetic clutch arrangement.

Another object of this invention is to provide a handpiece of the type described with a drill bur retention means of a magnetic-mechanical type.

A still further object of the invention is the provision of an air-water mixing chamber for directing a water spray on the rotating bur. A further object is to provide means for controlling the amount of water to reach the mixing chamber.

It is again another object of this invention to increase the efficiency of the handpiece by providing the rotor vanes with a novel pocket design and placing a retaining sleeve over portions of the vanes to prevent air escaping therefrom. This vane feature will permit the rotor to gain speed from the expansion of air while it is in the pockets as well as the speed gained from the air initially striking the vanes.

Other objects of the invention will become more readily apparent from the following detailed description taken in conjunction with the accompanying drawings in which:

FIG. 3 is a sectional view taken along the line 3—3 of FIG. 1;

FIG. 4 is a side view of the dental handpiece with portions broken away;

FIG. 5 is a vertical sectional view of another embodiment of the invention;

FIG. 6 is a side view of a still further embodiment of the invention with portions broken away.

Figure 1:
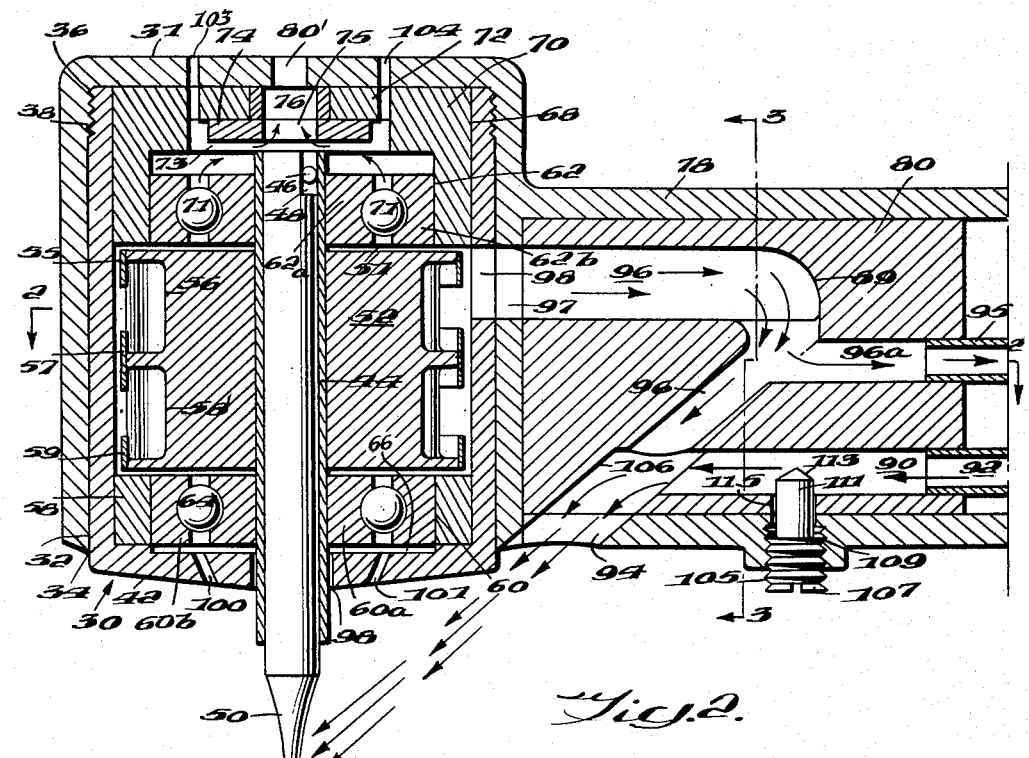
FIG. 1 is a vertical sectional view of the head of the handpiece showing details of the construction thereof.

Referring now to the drawings, the handpiece 22 consists of a handle 24 knurled for convenience and having a head or turbine housing 26 attached to the end thereof. The end of the handle is formed with a bend at 28 as is customary in handpieces of this type.

The head 26 has a substantially cylindrical head or bore 32 terminating at the lower end thereof in an opening 34 through which an air motor cartridge 30 is inserted. Bore 32 has screw threads 36 at one end thereof adapted to mate with screw threads 38 on the exterior of the cartridge housing 30. The housing 30 is cylindrical and has a bottom wall 42.

A magnetized cylindrical bur receiving shaft 44 has a pin 46 welded to the interior of its upper end. This pin 46 is adapted to be received in a notch 48 of the removable bur 50. The bur can easily be slipped into the shaft 44 and rotated until notch 48 aligns with the pin 46. The magnetic property of the shaft will hold the bur in this position while the shaft is at rest. When the shaft is driven at high speeds, the pin and notch arrangement are forced together by inertia and thus prevent slipping between the bur and the shaft during operation.

Intermediate the ends of the shaft 44 is the fixedly attached cylindrical rotor 52. Referring to FIG. 1, there can be seen spaced around the rotor a plurality of pockets. These pockets are spaced about the cylinder in two rows 56 and 58'. The pockets in each row may be staggered circumferentially from the pockets in the other row for reasons later described. Annular sleeves 55, 57 and 59 circumscribe the rotor pockets at points not to interfere with the air streams striking these vanes. The purpose of the sleeves is to retain as much of the air pressure as possible about the rotor assembly during rotation. This feature is covered in greater detail in the description of the operation of the handpiece.

The normally lower end of the turbine shaft 44 is rotatably supported by the anti-friction lower bearing 60 having an inner race 60a and an outer race 60b and loosely held anti-friction members such as balls 64. Inner race 60a is fixedly secured to shaft 44 and will rotate with the shaft. The outer race 60b is mounted on a resilient annular mounting 58 which is secured to the interior of the motor housing 30 by means such as glue. Note at this time that bearing 60 is spaced from the bottom 42 of the housing 30 at 66.

The arrangement of the normally upper bearing 62 is substantially the same as that of bearing 60. The inner race 62a is secured to the shaft 44 at a point spaced slightly at 51 from the rotor 52. The outer race 62b is secured to a resilient mounting 70 which is affixed to the upper portion of the cylindrical cartridge 30 at 68. Resilient mounting means 70 has an inwardly extending flange portion 72. Flange 72 forms the top of motor housing 30. The bearing 62 is spaced from flange portion 72 at 73.

Attached to the underside of flange 72 is an annular magnet 74, which is spaced slightly from the top of shaft 44 during operation of the handpiece. The central aperture 75 formed by said magnet is in alignment with aperture 76 formed by the flange 72, and they both are in alignment with aperture 80' in the center of the top plate 31 of head 26.

Figure 2:
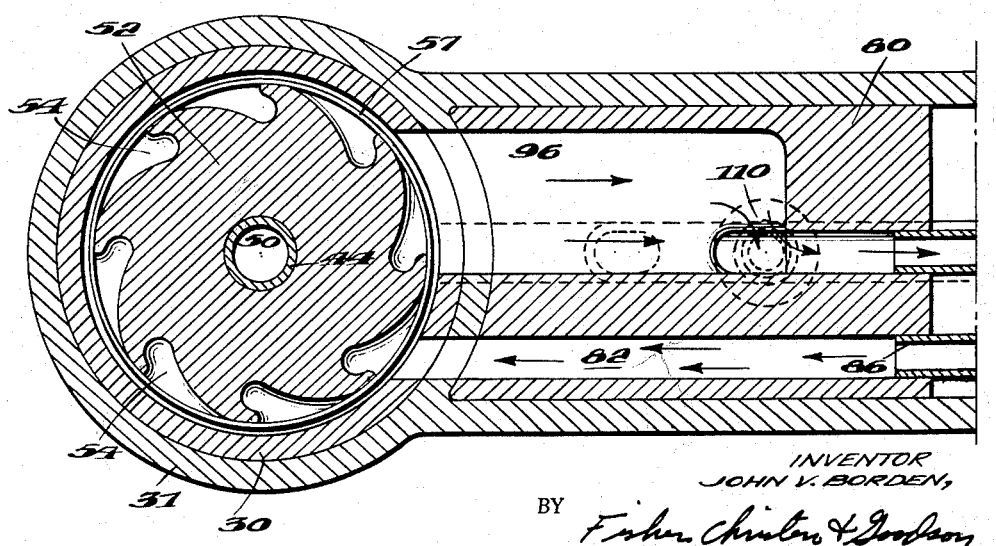
FIG. 2 is a horizontal sectional view of the head taken along the line 2—2 of FIG. 1.

Referring to FIG. 4 of the drawings, a handle 22 extends from the head 26. The handle consists of a tube portion 78 near the head and a knurled portion 24 angularly disposed to said tube portion as is conventional in this type handpiece. The tube section portion 78 has a neck block 80 inserted tightly in a portion of the tube adjacent the head 26. The neck block has a plurality of openings therein as best seen in FIG. 3. Two air inlet holes 82 and 84 are in communication with the interior of the cartridge through aligned apertures provided in the bore 32 and aligned apertures provided in the side wall of the housing 30. In FIG. 2, the apertures in communication with the hole 84 would be directly below the apertures communicating with inlet 82, and thus cannot be seen in the drawing. In FIG. 1, it can be seen that a fluid or gas directed through the above aligned apertures into the interior of cartridge 30 will strike the pockets 56 and 58 and rotate the shaft 44.

Referring to FIG. 3, it can be seen that extending from inlet holes 82 and 84 are tubes 86 and 88 which extend through the end of the handle to an air pressure supply.

Neck block 80 has another bore 90 which has extending therefrom a tube 92 which also extends through the rear of the handle. This tube delivers water to a spray chamber 94 described below.

Another opening 96 in the neck block 80 receives exhausted air from rotors 44 as they complete their rotating cycle. Opening 96 is in communication with the interior of cartridge 30 through aligned port 97 in the head 26 and port 98 in the cartridge 30. The opening 98 turns at 89 and sends a portion of the exhausted air to mixing chamber 94, and the remainder of the air through opening 96a to the interior of handle 22. The portion directed to the mixing chamber 94 contacts the water dispensed from opening 90. The result is a spray which is directed at the bur 50 at its point of contact with the patient's tooth. A water control valve 105 comprises a screw cap 107 adapted to thread into an opening 109 in the tube portion of the handpiece. Extending from cap 107 is rod 111 having a pointed valve end 113. The rod protrudes into water supply tube 90 at the watertight bearing 115. It can easily be seen that by adjusting the screw cap 105 the resistance to water flow in tube 92 can be varied. This valve provides the operator of the handpiece a convenient way to vary the characteristics of the water spray to accomplish particular tasks with the drill. For some drilling tasks, a very light mist-like spray is desired and for others a spray more heavily laden with water.

In the handpiece described above, the handpiece is provided with connections to water and gas, preferably air, under pressure which may be controlled by separate valves conveniently located near the dentist's hand or foot. These valves are provided with controls to introduce air and water, or for introducing both air and water simultaneously. These controls are of a conventional nature and form no part of this invention.

In operation, the handpiece is connected through suitable valves to the water and air supplies normally present in a dentist's office. The air travels down tubes 86 and 88, through holes 82 and 84 through the aligned apertures of the bore 32, and through the aligned apertures of the housing, and then striking pockets 56 and 58. When the air strikes the vanes it causes the rotor to rotate, which in turn causes the bur 50 to rotate through the rotation of shaft 44. The air jet striking the pockets gives the rotor its primary rotation. In addition to this, the air in each of the pockets expands as the cylinder rotates. The unique design of the pockets interacting with the sleeve sections 55, 57 and 59 gives the cylinder a further rotative force which greatly increases the torque and efficiency of the dental bur 50.

Some of the air finally escaping from the pockets 56 and 58 will find its escape through the loosely held balls 64 and 71 of bearings 60 and 62. This provides the balls with a cushion of air at high speeds. The air traveling through the top bearing 62 is exhausted through aligned ports 75, 76 and 80'. The turbine itself is maintained in a cushion of air at high speeds such that it floats. As can best be seen from FIG. 1, the air must travel between the magnetized shaft 44 and the permanent magnet 74. Ports 103 and 104 are small orifices merely to release any excess of pressure build-up in space 73. As long as air pressure is present the spaced relationship shown in FIG. 1 will exist. When air pressure is decreased the permanent magnet 74 will draw the shaft assembly to itself and greatly reduce coasting of the rotor.

Air escaping from the lower line of pockets 58 will escape through the opening in bearing 60 and out the space 98 between the shaft 44 and the bottom 42. Small auxiliary orifices 100 and 101 are also provided to aid in exhausting the air escaping through bearing 60.

The air which does not escape through the upper and lower bearings is returned to the hollow handle 24 via exhaust port 96 and 96a. The port is bent at 89 to force a portion of this air into chamber 94. The remainder of the air is exhausted into the interior of the handle or into tube 95, through opening 96a which is a continuation of port 96. This air is exhausted into the atmosphere through tube 95 at the end of handle 24, where it will cause no discomfort to the patient.

As can best be seen in FIG. 1, tube 92 delivers water under pressure to opening 90 in the neck block 80. The opening 96 delivering exhaust air, and opening 90 delivering water are each in commuication with mixing chamber 94. A spray effect is created in the chamber and due to the slope 106 of this chamber, the spray is directed at bur head 51. This facilitates keeping the bur and tooth cool at the point of drilling. Another advantage of this arrangement is the spray effect will increase as the rotation of the rotor increases due to the increase in pressure of the exhaust air. Thus, a maximum of cooling is present when most needed.

The handle structure of the handpiece and the lower structure of the cartridge of the embodiment shown in FIG. 5 are the same as the cartridge 30 of the previously described embodiment. The rotor assembly, however, comprises a cylinder 152 which is cone shaped at its upper end as at 163. The cone terminates in a projection 156. The bore 126 is open at its upper end and is adapted to have cover 158 threaded therein. The cover 158 has an opening 162 in its center adapted to loosely receive the projection 156.

The cylindrical portion of the rotor has a series of circular cup shaped pockets arranged into rows 157 and 159. Although not shown as such on FIG. 5, the pockets on either row may be in staggered relationship with the pockets of the other row. This staggered relationship, due to the air striking one pocket at a time, gives a stable operation to the rotor. This staggered relationship is preferred in each of the embodiments of this invention.

Sleeves such as 55, 57 and 59 may be placed around the pockets in the manner shown in the embodiment of FIG. 1 if that is desired. The shaft 164 is magnetized and may be press fitted into a receiving chamber 165 in the cylinder 152. The pin and slot arrangement of the embodiment shown in FIG. 1 may be used to secure the bur to the receiving chamber, or any other conventional way to make such a connection.

When the handpiece is placed in operation the rotor will begin rotating as described in the first-mentioned embodiment. The air exhausted through the lower raceway and the handle will react in a similar manner as described above; however, the air exhausted through the upper portion of the cartridge will travel the space between cone 163 and cap 158 and then exhaust itself through the annular space formed by projection 156 and opening 162. The equal pressure of the air escaping through this annular space and space between the cap and the cone will form an air bearing which provides smooth operation even at very high speeds.

Referring again to FIG. 5, it can be seen that the bore 126 is closed at the bottom but has an opening 198a to receive the bur and the shaft 164. The rotor mechanism in this embodiment may be inserted through the top of the head when cap 158 is removed.

FIG. 6 is a side view of an embodiment which is the same as the embodiment of FIG. 5 with a slight change in the bottom structure of the head and cartridge structure. In this embodiment the outer raceway of bearing 160 is mounted directly to the housing 161 rather than through a resilient member. A greater amount of air is allowed to escape through the bearing 160 and enlarged opening 198b.

Figure 7:
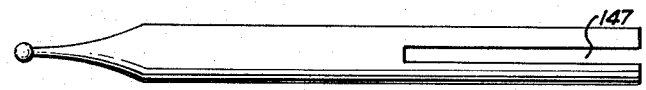
FIGS. 7 through 15 show various bur structures which may be used with this invention.
Figure 8:

FIGS. 7 and 8 show a further novel dental bur structure which can conveniently be used with this type handpiece. In this embodiment the stem end of the bur is split as at 147. This split portion would lock with a corresponding bridge within the shaft 44. This bridge would be a thin longitudinal member defining a diameter of the shaft and adapted to mate with the opening 147.

Figure 9:
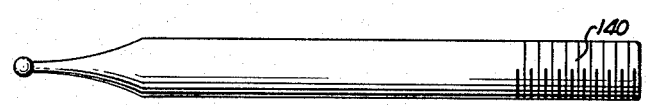

FIG. 9 shows a dental bur with threads 140 thereon. When using this type of bur, of course, the shaft would of necessity have a receiving thread on the interior of the shaft at the proper position.

Figure 10:
Figure 11:
Figure 12:
Figure 13:

FIGS. 10 and 11 show a bur having slot 149 along one side thereof. The slot has a curved bottom 149a. The shaft 44 would have a matching ridge along one interior side adapted to mate with the slot 149. FIGS. 12 and 13 show a slot arrangement which does not have a curved bottom, but work in the same manner as the FIG. 10 embodiment.

Figure 14:
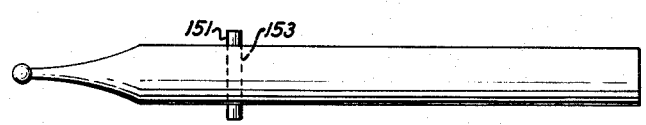
Figure 15:

FIGS. 14 and 15 show a still further type dental bur. This bur utilizes a pin 151 and an opening 153 arrangement. When using this embodiment there would have to be corresponding holes in the lower end of shafts such as 44 to receive the pin 151.

Figure 16:
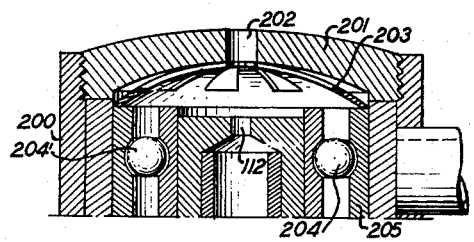
FIG. 16 shows another embodiment of the invention.

FIG. 16 shows a novel spring arrangement for this type handpiece. In this embodiment, the bore 200 has a removable cap 201 threaded therein. The top has an orifice 202 centrally located which exhausts air escaping through bearings 204. The principal novel feature of this embodiment is the use of a resilient washer between the outside of raceway 205 and the cap 201. The points of contact of this washer are along the top of the outside raceway of 205 and cap 201 near orifice 202. The hole in the center of washer 203 is aligned with orifice 202.

The spring washer 203 exerts a pressure on the outside raceway which helps eliminate noise during operation of the handpiece.

In a general manner, while there has been disclosed in the above description, what are deemed to be the most practical and efficent embodiments of this invention, it should be well understood that the invention is not limited to such embodiments as there might be changes made in the arrangement, disposition and form of the parts without departing from the principle of the present invention as comprehended within the scope of the accompanying claims.

I claim:

1. A dental handpiece comprising a handle provided with a cylindrical head having a closed end, a first magnet mounted on the closed end of said head, a fluid driven rotor cartridge secured in said head, said cartridge comprising a housing, a magnetized tool receiving rotor shaft in said housing and axially movable into and out of contact wtih said first magnet, a gas inlet tube in said handle communicating with the interior of said housing to direct a jet of gas tangentially to drive said rotor, said housing having ports positioned therein for directing air exhausted from said rotor toward the contact point between said magnet and said magnetic shaft to axially shift said shaft whereby said gases break said contact.

2. A dental handpiece comprising a handle provided with a hollow head, an air driven motor cartridge removably secured in said head, said cartridge comprising a housing, a magnetized tool receiving rotor shaft in said housing, said rotor shaft supported at opposite ends by radial bearings, and resilient mounting means between said housing and said radial bearings.

3. A dental handpiece comprising a head having a cylindrical cavity, an air driven motor cartridge removably secured in said cavity, said cartridge having a dental tool receiving rotor mounted therein, a hollow handle extending radially from said cylindrical cavity, an air inlet tube in said handle in communication with the interior of said housing for directing a jet of air tangentially to drive said rotor, a mixing chamber formed adjacent juncture of said cylindrical cavity and said handle, a second air tube in said handle for directing air to said mixing chamber, and means to direct a stream of water to said mixing stream whereby said air and water form a spray which is directed toward said dental tool.

4. The dental handpiece as described in claim 3 having an exhaust port in said handle and said second air tube is in communication with said exhaust port.

5. A dental handpiece operated by a fluid-driven rotor comprising, a handle provided with a head at one end, a cartridge removably received within said head, said cartridge comprising a cylindrical housing, a rotor within said housing and bearings at each end of said housing supporting said rotor, said rotor being provided with circumferentially arranged vanes, and removable resilient mounting means within said head positioned between a portion of the head and one of said bearings for cushioning said bearing.

6. The cartridge as described in claim 5, wherein the rotor vanes are a plurality of series of vanes around said shaft in a staggered relationship.

7. The cartridge as described in claim 6, wherein said housing has separate air inlet means for each series of vanes.

8. The cartridge as described in claim 5, wherein said rotor vanes are curved and have an air pick-up surface and a rear surface, the radius of said pick-up surface being greater than the radius of said rear surface.

9. An air driven dental cartridge comprising a housing, a rotor assembly in said housing, a removable cap on said housing, radial bearings supporting said rotor assembly and having an inner and outer raceway, a resilient washer between said cap and said outer raceway whereby said washer exerts a resilient pressure on said outer raceway.

10. A dental handpiece comprising a cylindrical head, an air driven motor cartridge removably secured in said head, said cartridge having a dental tool receiving rotor mounted therein, a hollow handle extending radially from said cylindrical head, a plurality of air inlet tubes in said handle in communication with the interior of said housing for directing a jet of air tangentially to drive said rotor, a plurality of rows of pockets in said rotor adapted to receive the air from said inlet tubes, a removable cap on said head, a conical section on said rotor spaced slightly from said cap whereby air exhausted from said pockets escapes from the space between said conical section and cap and forms an air bearing for said rotor.

11. A dental handpiece comprising a cylindrical head, an air driven motor cartridge removably secured in said head, said cartridge having a dental tool, receiving rotor mounted therein, a hollow handle extending radially from said cylindrical head, a plurality of air inlet tubes in said handle in communication with the interior of said housing for directing a jet of air tangentially to drive said rotor, a plurality of rows of pockets in said rotor adapted to receive the air from said inlet tubes, a cone shaped interior at one end of said head, a cone shaped portion on one end of said rotor and adapted to be spaced slightly from said cone shaped interior, whereby air exhausted from said pockets escapes through the space between said conical sections and forms an air bearing for said rotor.

12. In a fluid driven dental handpiece, a generally cylindrical housing, a turbine rotor within said housing and bearings at each end of said rotor supporting the rotor in the housing, said rotor comprising a generally cylindrical body provided with a plurality of axially extending peripherally arranged vanes, said housing being provided with a fluid inlet opening arranged to direct fluid tangentially against said vanes, each of said vanes comprising a pocket provided in the periphery of said rotor, the exterior of each pocket being partially enclosed with a shield circumferentially flush with the periphery of the rotor to assist in the entrapment of motive fluid.

13. The invention as defined in claim 12, wherein said rotor is provided with a plurality of axially spaced rows of vanes, and said housing is provided with a fluid inlet opening for each said row of vanes.

References Cited in the file of this patent
UNITED STATES PATENTS

| | | |
|---|---|---|
| 2,090,885 | Clark | Aug. 24, 1937 |
| 2,334,755 | Eglinton | Nov. 23, 1943 |
| 2,605,619 | Serduke | Aug. 5, 1952 |
| 2,606,366 | Stevens | Aug. 12, 1952 |
| 2,897,596 | Maurer | Aug. 4, 1959 |
| 2,871,562 | Kern | Feb. 3, 1959 |
| 2,945,299 | Fritz | July 19, 1960 |